United States Patent [19]
Brown
[11] 3,987,535
[45] Oct. 26, 1976

[54] BOTTLE DECAPPING METHOD AND APPARATUS

[76] Inventor: Winton F. Brown, 313 Alamatos Drive, Danville, Calif. 94526

[22] Filed: July 31, 1975
[21] Appl. No.: 600,831

[52] U.S. Cl. .................... 29/427; 29/200 D; 29/208 B; 53/381 A
[51] Int. Cl.[2] .................... B23P 19/02
[58] Field of Search .................... 29/426, 427, 200 D, 29/208 B; 53/381 A, 381 R, 133; 225/96, 96.5

[56] References Cited
UNITED STATES PATENTS

| | | | |
|---|---|---|---|
| 3,589,103 | 6/1971 | Calvillo et al. | 53/381 A |
| 3,686,824 | 8/1972 | Rink et al. | 53/381 A |
| 3,775,829 | 12/1973 | Rice | 29/426 |
| 3,803,795 | 4/1974 | Ouellette | 53/381 A X |
| 3,805,490 | 4/1974 | Blecher | 53/381 A |
| 3,852,867 | 12/1974 | Risener | 29/208 B |

*Primary Examiner*—Victor A. DiPalma
*Attorney, Agent, or Firm*—C. Michael Zimmerman

[57] ABSTRACT

A method and apparatus is described for removing screw caps from returned beverage bottles prior to such bottles being cleaned and refilled. The method includes separately gripping the screw cap and the bottle and thereafter rotating the cap relative to the bottle while preventing translational movement of such cap along the helix of the cap threads so that the threads on the cap will be stripped to facilitate its release from the bottle. The apparatus includes a plurality of decapping heads at a decapping station, each of which heads both frictionally engage the exterior cylindrical side wall of a cap on a bottle passing through the decapping station and pierces the cap's crown wall with a piercing tool having a non-circular cross-section, to obtain the firm grip on the cap required to rotate the same with sufficient force to strip its threads.

15 Claims, 10 Drawing Figures

BOTTLE DECAPPING METHOD AND APPARATUS

BACKGROUND OF THE INVENTION

This invention relates to a method and apparatus for removing closures from containers and, more particularly, to such a method and apparatus which is especially designed to remove screw caps from reusable beverage bottles prior to such bottles being cleaned and refilled.

The now common practice of providing beverages in returnable bottles which have metal screw caps, i.e., having metal closures which are threadably received on the bottle rather than being crimped thereon, have provided bottlers with a new problem. That is, it is not unusual for a consumer of a beverage to replace a screw cap on the bottle after the beverage is removed. When the bottle is of the returnable type, this means that the bottler will receive bottles to be refilled which are capped. The old cap must then be removed from the bottle by the bottler before the bottle can be cleaned and then refilled.

Various methods and mechanisms have been devised to automatically remove any screw caps on returned bottles being processed through a bottle filling assembly line. Most of such mechanisms are designed to unscrew the metal cap from the bottle. For example, some of such mechanisms rely on gripping tongs or the like to grasp the caps on passing bottles and unscrew the same therefrom. Because it is quite expensive to provide a sensing system for first determining whether or not a passing bottle has a cap on it, most of such mechanisms grip the threads on the neck of a bottle when a cap is not present. It will be recognized that it requires a highly complicated arrangement which will result in the gripping members not grasping the neck of a bottle with sufficient force to damage the threads, but which will grip any cap thereon with enough force to obtain the firm hold necessary for an unscrewing operation. Because of the difficulty in providing such a gripping head, most machines which rely on this principle are too complicated and sensitive to be reliable. Another approach which has been taken is to pierce the cap with a piercing tool which has a non-circular cross-section. Then when the tool is rotated, the edges of the tool in engagement with the periphery of the hole so pierced in the metal cap will, it is asserted, rotate the cap along with the tool. The bottling method and apparatus described in U.S. Pat. No. 3,775,829 is an example of such a method and apparatus. The difficulty with such an arrangement, though, is that it is not unusual for the cap to be so tightly secured on the container that rotation of the tool will enlarge the hole in the cap, rather than rotate such cap relative to the bottle. Thus, machines utilizing this approach have also not been well accepted.

In view of the problems with available decapping apparatuses, it is not unusual for bottlers to have caps on returned bottles actually removed manually. It will be appreciated, though, that because of the speed with which most modern bottling lines operate, i.e., cleaning and filling bottles at a rate of 300–600 bottles per minute, the amount of labor required for such an operation is prohibitively expensive.

SUMMARY OF THE INVENTION

The present invention provides a method and apparatus for removing closures, particularly metal screw caps, from containers in a simple and straight-forward manner. In this connection, the method and apparatus of the invention differs markedly from approaches taken in the past. That is, the method of the invention comprises stripping the threads from the cap to release its threaded engagement with the container, and thereafter translationally separating the cap from the container. Such stripping is most easily and simply accomplished by rotating the cap on the container while at the same time preventing translational movement of such cap along the helix of the cap threads. The result is that the bottle threads act, in effect, as a swage which bends the metal cap threads outward to the extent necessary to permit translational movement of the cap relative to the bottle neck. It should be noted that in practice it is not unusual for a bottle cap actually to be split by the swaging operation, thereby making the subsequent lifting of the cap from the bottle even easier.

Because the invention does not rely upon unscrewing a cap from a bottle neck and, hence, require the cap to be capable of retraction while being rotated, the apparatus of the invention is capable of including relatively simple means for gripping the cap. Such gripping means includes both a piercing tool having a non-circular cross-section to be inserted through the cap crown or wall covering the bottle mouth, and means for frictionally gripping such cap, such as about its cylindrical side wall. This combination of both a piercing and a frictional gripping arrangement assures that a sufficient "bite" is obtained on any cap to remove even quite tightly secured caps. The frictional gripping means is most simply provided as an inner frictional surface of a socket which receives the cap and frictionally engages the cylindrical side wall of such cap. The piercing tool then actually projects into such socket for piercing any cap which is received within the socket so one obtains the advantage of the piercing tool engaging the edges of the hole in a cap for rotation, at the same time the cap is frictionally gripped about its cylindrical side wall.

The invention includes other features and advantages which will be described or will become apparent from the following more detailed description of a preferred embodiment.

BRIEF DESCRIPTION OF THE DRAWINGS

With reference to the accompanying three sheets of drawing.

DETAILED DESCRIPTION OF A PREFERRED EMBODIMENT

Figure 1:
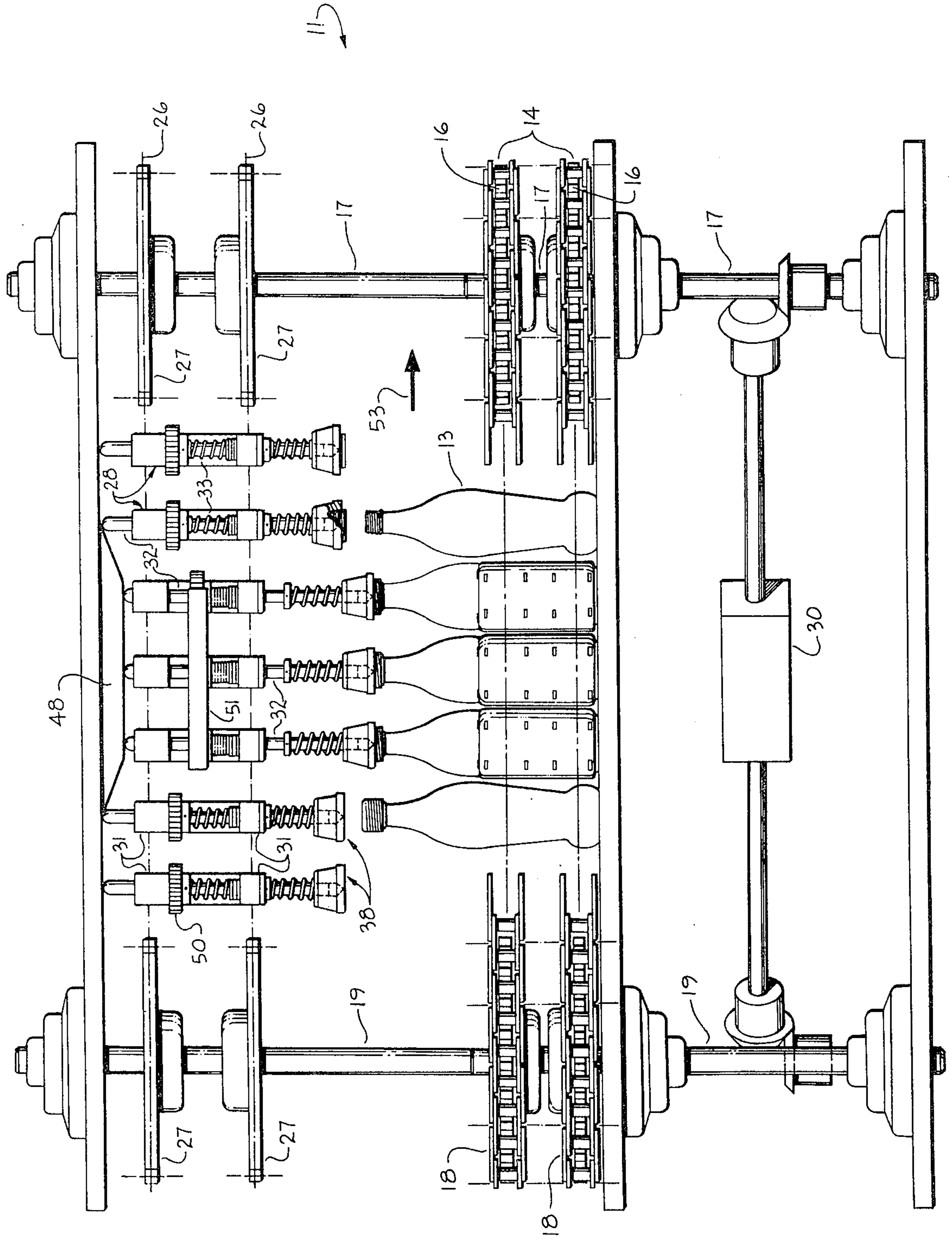
FIG. 1 is a partially broken-away and schematic elevation view of a preferred embodiment of the decapping apparatus of the invention.

A preferred embodiment of the decapping apparatus of the invention is generally referred to in the drawing by the reference numeral 11. Such apparatus provides, in effect, a decapping station to be positioned in a bottle filling assembly line in advance of the bottle cleaning station. In this connection, a conveyor 12 (FIGS. 2 and 3) transports a plurality of bottles 13 in line through the decapping station.

Figure 3:
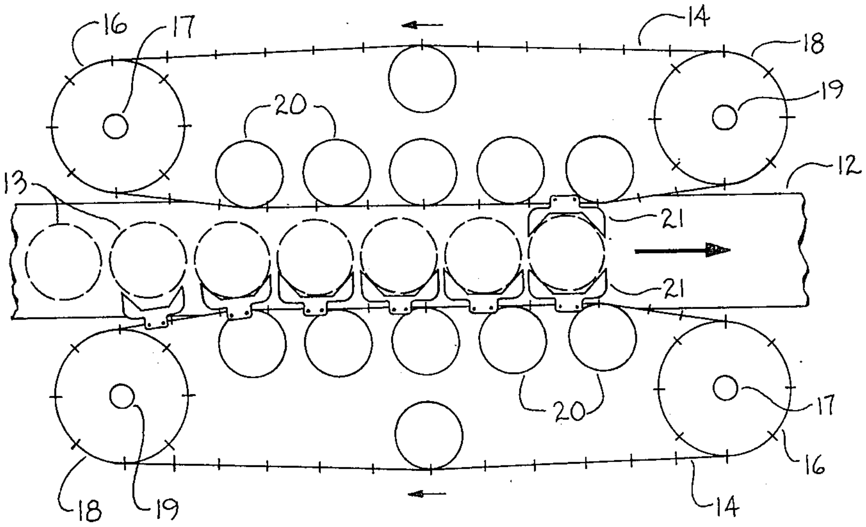
FIG. 3 is a schematic plan view illustrating the chain course of the bottle gripping means of the preferred embodiment of the invention.
Figure 4:
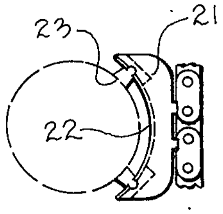
FIGS. 4 and 5 are enlarged detailed views of portions of the bottle gripping means of the preferred embodiment of the invention; and FIGS. *6a–6e* are enlarged partial elevation views showing details of the decapping head mechanism of the apparatus and sequential stages in its operation.

Means are provided as part of the apparatus at the decapping station for gripping each of the bottles 13 in order to prevent axial rotation thereof. That is, two pairs or sets of endless chains 14 are provided respectively along each side of the conveyor 12. The chains 14 of each set are driven by coaxial drive sprockets 16 which are respectively mounted on a common drive support shaft 17. Chain turn-around idler sprockets 18 for each set of chains are positioned along the conveyor 12 spaced from its associated pair of drive sprockets 16. As schematically illustrated in FIG. 3, the sprockets 16 and 18 provide a course for each respective pair of chains 14 with the two courses extending parallel and opposite to one another along a length of the conveyor. A plurality of smaller idler sprockets 20 maintain the chains 14 in their path of travel along the conveyor.

Each set of chains 14 supports equally distributed along the coextensive length of the chains a plurality of bottle gripping blocks 21. As illustrated, each gripping block 21 includes a concave cylindrical surface 22 which is designed to mate generally with the body of a bottle being transported through the decapping station by the conveyor 12. Moreover, the gripping blocks 21 supported on the opposite sides of the conveyor 12 face one another to grip passing bottles on opposite sides of the bodies thereof as shown.

Figure 5:
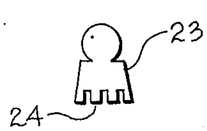

As a feature of the instant invention, the gripping blocks 21 are adapted to prevent axial rotation of any bottle which is gripped thereby. To this end, each of the concave surfaces 22 includes means for frictional engagement with the bottle. In the preferred embodiment being described, such means takes the form of elongated inserts 23 of rubber or the like. As shown in the enlarged end view of FIG. 5, each of the inserts 23 is serrated along the face 24 thereof to enhance its frictional engagement with the body of a bottle. Moreover, the spacing between the blocks 21 on opposite sides of the conveyor 12 is chosen relative to the diameter of the bottle bodies to force the resilient inserts 23 into tight frictional engagement with such bottles.

Gripping means is also included for gripping caps on the bottles separately from the bottles. To this end, another pair of endless chains 26 are supported on sprockets 27 directly above the sprockets 16 and 18 for one of the sets of chains 14. That is, the sprockets 27 for the chains 26 are mounted on the same support and support drive shafts 17 and 19 on which the sprockets 16 and 18 of the rear set of chains 14 are mounted. Moreover, the sprockets 27 are of the same size as the sprockets 16 and 18, with the result that the chains 26 will be driven in synchronism with the set of chains 14 over which they are supported. In this connection, an electric motor 30 is schematically shown coupled through suitable drive shafts and bevel gears to the drive support shafts 17. It should be noted that both the gripping arrangements for the bottles and the cap gripping means to be described are driven along the paths of travel of the bottles 13 at the same speed as conveyor 12 so that during the time the bottles are passing through the decapping station, there is no relative movement between such bottles and either of the gripping means.

Chains 26 support in alignment with each pair of gripping blocks 21, a cap gripping mechanism 28. As shown, each gripping mechanism 28 includes a support block 29 which is secured between the two chains 26 and supports a pair of sleeves 31 in axial alignment with the mouth of any bottle 13 supported therebeneath by a pair of the gripping blocks 21. Sleeves 31 define the path of travel of a plunger 32 which is supported therein. In this connection, the plunger 32 is normally urged into its upper position by a compression spring 33. That is, coil spring 33 is compressed between a collar 34 secured to the plunger 32 via a set screw 36, for example, and a thrust ball bearing 37 which separates such spring from the upper surface of the lower sleeve 31.

Mounted on the lower end of plunger 32 is the actual cap gripping head 38. It should be noted here that the caps of concern are typically of a relatively thin metal which is fairly easily deformable. In this connection, such caps are most often provided to the bottler before threads are formed therein. The threads are formed in the cap after it is placed over the mouth of the bottle by swaging the cap to conform it to the bottle threads. As a particularly salient feature of the instant invention, the head 38 is designed to grip any such cap on a bottle with two separate mechanisms which together provide the good cap engagement required to transmit the force to the cap necessary to rotate the same against the threads of the bottle for stripping. More particularly, the head 38 first includes a socket 39 for frictionally engaging the cylindrical side wall 40 of a cap 41 threaded over the mouth of a bottle 13. To this end, each socket 39 is made of a material, such as hard rubber, which provides the socket with an inner frictional gripping surface 42 which is resiliently deformable so that such surface will mate with the side wall of a cap. Most desirably, the inner surface of each socket 39 is shaped to enhance such frictional engagement. That is, as illustrated in detail in FIGS. **6*a* and 6*b*, the inner surface of the socket tapers inwardly from the socket opening through which the cap is receivable from a diameter which will receive such cap to a diameter which is substantially less than that of the cap. The result is that when the socket is forced over a cap 41, the resilient material defining the socket inner surface will be deformed so that such surface 42** will mate with the exterior of the side wall of the cap.

Gripping head 38 further includes a piercing tool 43 which projects axially into the socket in order to pierce the upper or crown wall 44 of a cap as it is received within the socket 39. The piercing tool 43 is most simply provided as an extension of the plunger 32 positioned axially within the socket, which extension is relieved as necessary to provide a piercing point 46. As can be seen by comparing FIGS. **6*c* and 6*d*, for example, (FIG. 6*d* being rotated 90° relative to FIG. 6*c*) the piercing point 46 is formed by relieving the plunger 32 on opposite sides at its lower end to provide a centrally depending, flat blade having its narrow sides tapered to the point 46. The piercing tool 43, therefore, has a non-circular cross-section adjacent the piercing point 46 so that the portion of the tool extending through an opening made by it in a cap wall will be able to engage and apply rotative force to such cap. Moreover, such relieving of the lower end of the plunger 32 to provide the piercing blade will result in a shoulder (FIG. 6*d*) on the shank of the piercing tool rearwardly of the piercing point 46 for abutment with the crown wall 44 of the cap. The function of the shoulder 47** will be described in more detail hereinafter.

Means are provided for driving the plunger 32 downward against the compressive force of the spring 33 in order to apply the cap gripping head 38 to a cap on a bottle. That is, positioned in the path of travel of the plunger 32 when the decapping mechanisms 28 of which they are a part are positioned above bottles 13 is a cam 48 having a leading ramp edge 49. As can be seen from FIG. 1, as the mechanisms 28 are advanced to the right as viewed in such figure, the rounded upper end of each of the plungers 32 will in turn engage the ramp 49 so that the plunger will be forced downwardly. The distance through which the plungers are moved downward is selected to apply the decapping head 38 circumferentially about the neck of any bottle thereunder and, hence, grip any cap on such neck. It should be noted that the cam 48 extends along the path of travel of the plungers rearwardly of the ramp 49 and is shaped to maintain such plungers depressed with their heads in engagement with any caps on bottles therebeneath for a selected period of time.

As another salient feature of the instant invention, means are provided for rotating each of the cap gripping heads and, hence, any cap received therein, while the same are maintained against translational movement. More particularly, each of the cam mechanisms includes secured to its plunger 32 a pinion 50 which, when the plunger is depressed, is positioned to engage a rack 51 mounted at the decapping station in the path of travel of the pinions 50 when the gripping head 38 associated therewith is depressed. (Note that in FIG. 6*b*, for drawing clarity the rack 51 is shown revolved 90° out of place about the decapping mechanism.) During the time interval that the decapping head is prevented from translational movement with respect to the bottle, such head is subjected to rotation. As discussed previously, the result will be that the threads on any cap therein will be stripped therefrom by the threads on the bottle neck. That is, because the cap threads are prevented from translationally moving along the helix of the neck threads, the neck threads will engage such cap threads and force the same outward during the rotation. In many instances, this operation will result in the metal of the cap actually splitting longitudinally across the threads. Such splitting makes removal of the cap even simpler. It should be noted that most desirably, the piercing tool is relied upon to provide the majority of the engagement with a cap required to rotate the same and the inner frictional gripping surface of the socket provides only that additional grip which is required to assure that the grip will be as sure as necessary to rotate the cap and strip its threads. This is to minimize the amount of wear caused on the inner frictional surface 42 by its rotation on the neck of a bottle not have a cap thereon. In this connection, it will be appreciated that when no cap is on the bottle, it will only be the inner frictional surface of the socket 42 which will engage the mouth of the bottle. It will also be appreciated that the exterior diameter of the bottle providing the neck will, of course, be less than that of a cap, with the result that there will be less frictional engagement between the inner surface of the socket and a bottle neck than there is between such surface and the cylindrical side wall of a cap.

Most desirably, the direction the caps are rotated on the bottles is the direction which normally advances the caps onto the same. That is, with reference to FIG. 1, the bottles are passed through the decapping station in the direction indicated by the arrow 53. With the rack

51 in front of the pinion path of travel as shown in FIG. 1, the decapping heads and, hence, any cap gripped thereby will be rotated in the direction which tends to advance the cap further onto the bottle. The advantage of such is that there is no tendency for the cap to move further upward into the decapping head during the rotation, which upward movement might cause difficulty in the later removal of the cap from the decapping head in the manner to be described. Translational movement of the cap relative to the bottle during such rotation is then prevented by the cap "bottoming out" on the bottle threads. Such bottoming out will maintain an essentially constant distance relationship between the bottles and the caps during the rotation to prevent translational movement of the caps relative to the bottles along the helix of the cap threads.

After rotation of the decapping heads 38 to strip the threads from any caps on the bottles, the plungers 32 engage a retraction ramp 52 at the exit end of the cam 48. Such retraction ramp allows the plunger and, hence, the decapping head 38 thereon to be translationally retracted from any bottle by the force of compression spring 33. The result will be that any cap which is gripped by the head will be translationally separated from its bottle.

Figure 2:
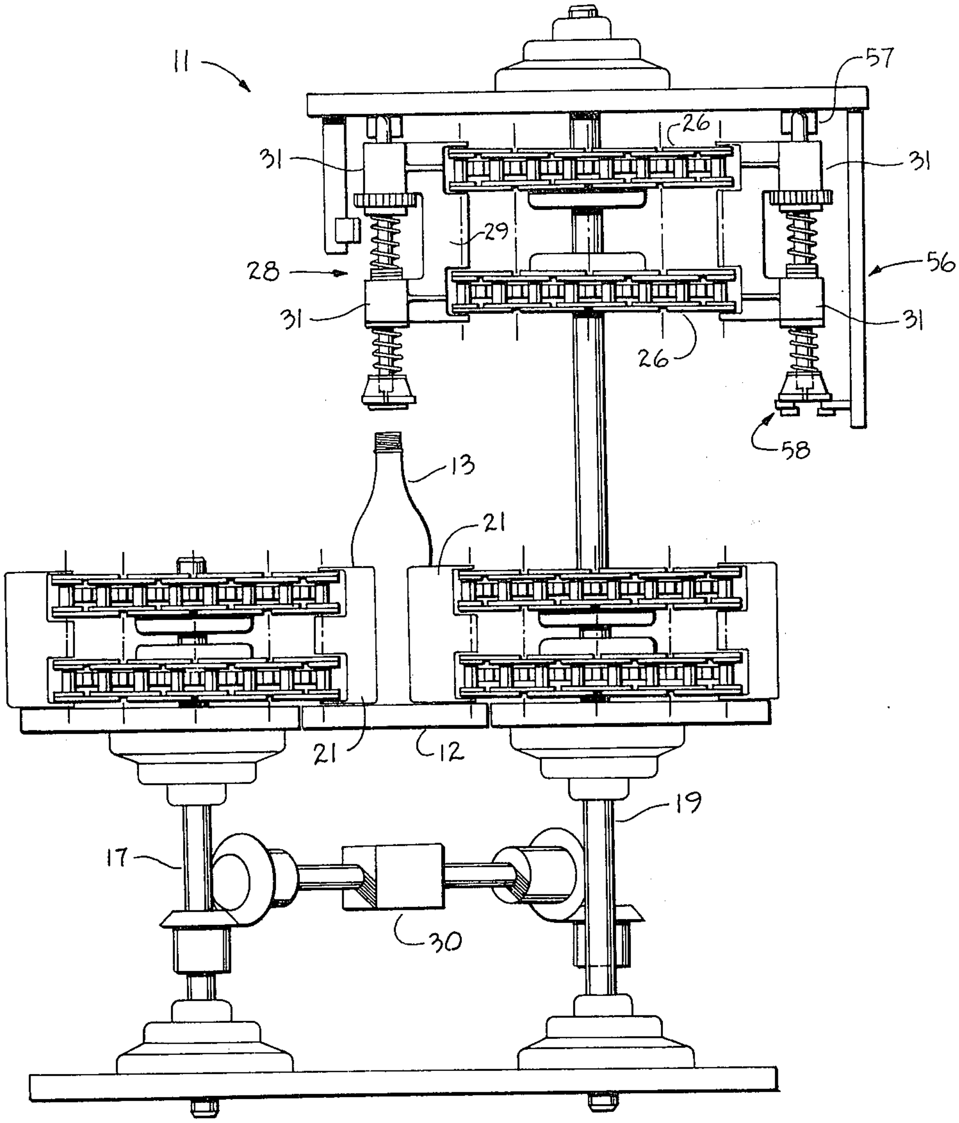
FIG. 2 is a partially broken-away and schematic end elevation of the decapping apparatus of FIG. 1.
Figures 6A, 6B, 6C, 6D, 6E:
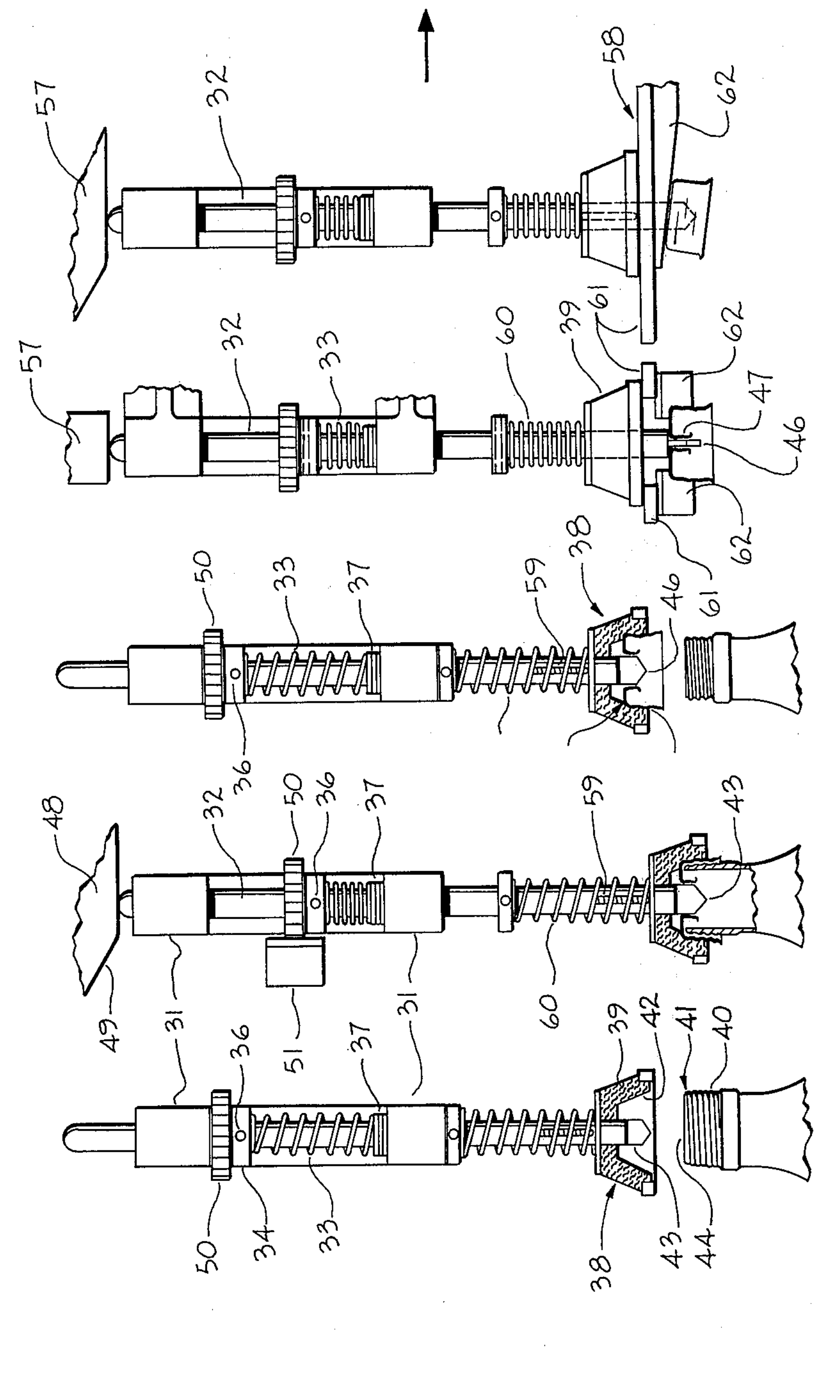

The apparatus of the invention further includes means for removing any cap engaged within a decapping head 38 after such head is moved translationally away from a bottle. More particularly, as is illustrated in FIG. 2, a cap removal apparatus, generally referred to by the reference numeral 56, is positioned in the path of travel of the decapping mechanisms 28 during their return movement to the location of the entry of the bottles to the decapping station. Such removal mechanism 56 includes a second cam 57 positioned in the path of travel of the upper end of the plunger 32 which again causes such plunger to be depressed. In this instance, however, means are provided for preventing the socket 39 from being depressed along with the plunger. That is, as best seen in FIGS. 6*d* and 6*e*, a ramp fork 58 is positioned beneath the cam 57 to engage the cap and prevent it from being lowered along with the plunger 32. In this connection, it should be noted that the socket is secured to the plunger via a pin and slot keyway arrangement 59 and is normally urged downward on the plunger by a compression spring 60. The ramp fork 58 includes a pair of spaced apart tines 61 which engage opposite edges of the socket and prevent it from being moved downward, but provide sufficient space to allow any cap therein to be translationally pushed downward and out of such socket by the shoulder 47 of the piercing tool 43. In this connection, the shoulder 47 will abut against the upper or crown wall of the cap in order to impart to the cap the force necessary to drive it from within the socket.

As illustrated in FIG. 6*e*, ramp fork 58 includes along its lower surface a ramp 62 which engages the cap as the decapping mechanism moves along the rear of the decapping apparatus, and strips from the piercing tool any cap thereon. The cam 57 then terminates to again allow the plunger 32 to retract the piercing tool within the head prior to the decapping mechanism being fully recycled to the entrance of bottles into the apparatus for alignment with another bottle being passed through the decapping station.

The above description of a preferred embodiment exemplifies the simplicity and effectiveness with which the method and apparatus of the invention are capable of removing a screw cap from a bottle. It will be recognized to those skilled in the art, however, that various changes and modifications can be made without departing from the spirit of the invention. For example, although in the preferred embodiment it is the decapping head itself which is rotated, it is only relative rotation between such decapping head and the bottle which is required. Therefore, when relative rotation is referred to herein and throughout the claims, this language is meant to encompass direct rotation of either or both the cap or the bottle. Moreover, although the decapping head of the apparatus is particularly designed to provide the firm grip of a cap required to rotate the cap threads against the bottle threads for stripping, it will be appreciated that such gripping head is potentially useful in other mechanisms in which the cap is actually removed from the bottle by being unscrewed therefrom. Thus, it is intended that the coverage afforded applicant be limited only by the terms of the claims and their equivalent language.

I claim:

1. A method of removing from a container a screw cap threadably received on said container covering the mouth thereof wherein said threads on said container are structurally more rigid than said threads on said cap comprising the steps of stripping the threads from said cap by rotating said cap relative to said container while maintaining the threads of said container intact and preventing translational movement of said cap relative to said container along the helix of said cap threads whereby the threads on said container will strip said threads on said cap for said release, and thereafter translationally separating said cap from said container.

2. The method of claim 1 wherein said step of rotating said cap relative to said container while preventing said translational movement includes rotating said cap relative to said container in the direction which normally advances said cap onto said container.

3. The method of claim 1 wherein said containers are bottles and further including the steps of continuously moving a plurality of bottles through a decapping station; and while said bottles are moving through said decapping station, applying separate gripping means respectively to said bottles and said caps and rotating one of said gripping means relative to the other while maintaining an essentially constant distance relationship between said bottles and said caps, whereby said threads of said caps are stripped while said bottles are moving continuously through said decapping station.

4. The method of claim 3 wherein said caps each have a cylindrical side wall circumscribing said container adjacent said mouth and providing said cap threads, said gripping means for said caps includes a socket which receives each of said caps and has an inner frictional gripping surface which frictionally engages the cylindrical side wall of each cap received thereby to grip the same, and said step of translationally separating said caps from said bottles includes moving the gripping means for said caps translationally away from each of said bottles while said socket is in frictional engagement with the cap thereon.

5. The method of claim 4 wherein said gripping means for said caps further includes a piercing tool having a non-circular cross-section projecting into said socket, and said step of applying said cap gripping means to each of said caps further includes piercing said cap with said tool when said socket receives said cap, whereby both frictional engagement of said cap by said socket inner surface and engagement of said piercing tool with the periphery of the aperture in said cap formed thereby is obtained.

6. The method of claim 5 wherein said piercing tool further includes a shoulder along its shank, and further comprising the step of pushing said cap with said tool shoulder from within said socket after said cap gripping means is moved translationally away from the bottle on which it was threadably received, and thereafter removing said cap from said piercing tool.

7. Decapping apparatus for removing from a container a screw cap threadably received on said container covering the mouth thereof comprising means for preventing for a predetermined time translational movement of said cap relative to said container along the helix of said cap threads, means for rotating said cap relative to said container during said predetermined time to thereby strip the threads from one of said container and said cap to release the threaded engagement of said cap with said container, and means for thereafter translationally separating said cap from said container.

8. The decapping apparatus of claim 7 wherein said means for preventing translational movement of said cap relative to said container, said means for rotating said cap relative to said container, and said means for thereafter translationally separating said cap from said container are all provided at a decapping station; and said apparatus further includes means for passing a plurality of said containers through said decapping station, and means also at said decapping station for gripping said containers and for separately gripping the caps thereon.

9. The decapping apparatus of claim 8 wherein said means for rotating said cap relative to said container during said predetermined time includes a rack and a pinion therefor, one of which is mounted at said decapping station along the path of travel of said container and the other of which is mounted on said cap gripping means at a position at which said rack and pinion will engage one another while a cap is gripped by said gripping means therefor to rotate said cap gripping means and, hence, rotate said cap.

10. The decapping apparatus of claim 8 wherein said means for gripping said cap includes both a piercing tool having a non-circular cross-section to be inserted through a wall of said cap and means for frictionally gripping the exterior surface of said cap.

11. The decapping apparatus of claim 9 wherein said cap includes a cylindrical side wall circumscribing said container adjacent said mouth and providing said cap threads, and said means for frictionally gripping said cap includes a socket having an inner frictional gripping surface which frictionally engages said cylindrical side wall of said cap.

12. The decapping apparatus of claim 11 wherein said means for translationally separating said cap from said container further includes means for axially moving said cap gripping means away from said container while said cylindrical side wall of said cap is frictionally engaged within said socket.

13. The decapping apparatus of claim 12 further including means for removing said cap from said socket after said cap is separated from said container.

14. The decapping apparatus of claim 11 wherein said inner frictional gripping surface of said socket tapers inwardly from a socket opening through which a closure is receivable into said socket.

15. The decapping apparatus of claim 14 wherein said inner frictional gripping surface of said socket is provided by a resilient material which is deformable to mate with said side wall of said closure upon said closure being received therein, and further including means for resiliently urging said socket onto said closure for said engagement of said cylindrical side wall thereof.

* * * * *